United States Patent [19]

Inoue et al.

[11] Patent Number: 5,677,861
[45] Date of Patent: Oct. 14, 1997

[54] ARITHMETIC APPARATUS FOR FLOATING-POINT NUMBERS

[75] Inventors: Genichiro Inoue, Osaka; Miki Urano, Wakayama, both of Japan

[73] Assignee: Matsushita Electric Industrial Co., Ltd., Osaka, Japan

[21] Appl. No.: 463,365

[22] Filed: Jun. 5, 1995

[30] Foreign Application Priority Data

Jun. 7, 1994 [JP] Japan .................................. 6-125025

[51] Int. Cl.$^6$ ........................................................ G06F 7/38
[52] U.S. Cl. ............................................................ 364/748
[58] Field of Search .................................. 364/748, 736, 364/750.5

[56] References Cited

U.S. PATENT DOCUMENTS 4,866,652 9/1989 Chu et al. .
5,204,828 4/1993 Kohn ........................................ 364/736

FOREIGN PATENT DOCUMENTS 4-328630 11/1992 Japan .

Primary Examiner—Tan V. Mai
Attorney, Agent, or Firm—McDermott, Will & Emery

[57] ABSTRACT

In the case of addition/subtraction of floating-point numbers, two mantissas having their digits aligned in a swapper and in a right shifter are supplied to an adder/subtracter via first and second mantissa selectors and two 1-bit right shifters so that they are subjected to addition/subtraction in the adder/subtracter, the result of which is rounded. In the case of multiplication/division of floating-point numbers, an intermediate sum and a carry, each outputted from a multiplier, are supplied to the above adder/subtracter via the above first and second mantissa selectors and the above two 1-bit right shifters, so that they are added in the adder/subtracter, the result of which is rounded. The result of rounding from the adder/subtracter is outputted as a normalized mantissa through a priority encoder and a left shifter. An exponent is processed by first to third exponent arithmetic units and an exponent selector. Thus, the amount of hardware of an arithmetic apparatus for executing the addition, subtraction, multiplication, and division of floating-point numbers can be reduced.

14 Claims, 4 Drawing Sheets

ARITHMETIC APPARATUS FOR FLOATING-POINT NUMBERS

BACKGROUND OF THE INVENTION

The present invention relates to an arithmetic apparatus for executing the addition, subtraction, multiplication, and division of floating-point numbers.

As scientific computations and graphic processing have become more complicated in recent years, there have been increasing demands for a higher-speed arithmetic apparatus for floating-point numbers. To satisfy the demand, a plurality of arithmetic units which operate in parallel have been provided in the arithmetic apparatus. On the other hand, there have also been increasing demands for a microcontroller for built-in use which can perform high-speed arithmetic operations. Under the present circumstances, however, it is impossible to use the arithmetic apparatus having the plurality of arithmetic units in the microcontroller because of the pursuit of cost reduction. Consequently, it becomes necessary to implement an arithmetic apparatus for floating-point numbers which performs different types of arithmetic operations with a reduced amount of hardware.

In U.S. Pat. No. 4,866,652 is disclosed an arithmetic apparatus for executing the operation of floating-point numbers in the form of (A×B)+C. In the apparatus, two multiplexers and a right shifter constituting a digit-aligning means for the addition and subtraction of mantissas are disposed in the stage subsequent to a multiplier. On the other hand, if an (n+m)-bit product obtained from the multiplication of an n-bit mantissa and an m-bit mantissa is rounded to n bits, an n-bit product mantissa is obtained. As disclosed in U.S. Pat. No. 4,866,652, a conventional arithmetic apparatus has conducted rounding in a mantissa multiplier. There has also been known a structure in which a rounding bit generator is provided in a mantissa multiplier so that the higher n bits of an (n+m)-bit product and bits for rounding are generated and outputted from the mantissa multiplier.

In the above arithmetic apparatus for executing the operation of floating-point numbers in the form of (A×B)+C disclosed in U.S. Pat. No. 4,866,652, the digit-aligning means for mantissas is disposed in the stage subsequent to the multiplier, so that the apparatus is not appropriate for single addition A+B and for single subtraction A−B. On the other hand, the structure in which rounding is conducted in the multiplier or in which the rounding bit generator is provided in the multiplier is disadvantageous in that the amount of hardware of the multiplier is increased accordingly.

In the IEEE (the Institute of Electrical and Electronics Engineers) 754 standard is defined the format for representing a 32-bit single-precision floating-point number, which comprises a 1-bit sign S, an 8-bit exponent E, and a 23-bit fraction F. According to the format, there is typically used a floating-point number that has undergone a normalizing process whereby a virtual non-zero bit and a base point are placed in the positions higher than the most significant bit (MSB) of the faction F. However, an actual exponent E is given a bias B so that the exponent E becomes a positive number. In the case of single precision, a number obtained by adding $2^7-1 =127$ as the bias B to an actual exponent is defined as the exponent E. As a result, a real number R expressed as a single-precision normalized number becomes:

$$R = (-1)^S 2^{E-127} (1.F) \quad (1)$$

where 1.F is termed a mantissa M.

The exponent of a multiplicand operand or the exponent of a dividend operand is designated as a first n-bit exponent X; the exponent of a multiplier operand or the exponent of a divisor operand is designated as a second n-bit exponent Y; and the bias of an exponent is designated as $B=2^{(n-1)}-1$. An actual exponent in the case of multiplication is calculated in accordance with the following equation:

$$(X-B)+(Y-B)=(X+Y-B)-B \quad (2)$$

Hence, a biased exponent to be calculated in the case of multiplication is X+Y−B. On the other hand, an actual exponent in the case of division is calculated in accordance with the following equation:

$$(X-B)-(Y-B)=(X-Y+B)-B \quad (3)$$

Hence, a biased exponent to be calculated in the case of division is X−Y+B.

In Japanese Laid-Open Patent Publication No. 4-328880 is disclosed an exponent arithmetic unit for calculating the product exponent X+Y−B and the quotient exponent X−Y+B by means of a single adder. However, the above exponent arithmetic unit is disadvantageous in that it cannot perform exponent processing in the case of addition/subtraction.

SUMMARY OF THE INVENTION

An object of the present invention is to provide an arithmetic apparatus with a reduced amount of hardware which is appropriate for the execution of the single addition, single subtraction, single multiplication, and single division of floating-point numbers.

First and second arithmetic apparatus according to the present invention assume that each of them is an arithmetic apparatus for floating-point numbers wherein an exponent and a mantissa of an augend operand or of a minuend operand is given as an exponent and a mantissa of a first operand, an exponent and a mantissa of an addend operand or of a subtrahend operand is given as an exponent and a mantissa of a second operand, an exponent and a mantissa of a multiplicand operand or of a dividend operand is given as an exponent and mantissa of a third operand, and an exponent and a mantissa of a multiplier operand or of a divisor operand is given as an exponent and a mantissa of a fourth operand.

The first arithmetic apparatus according to the present invention has adopted a structure in which a digit-aligning means for mantissas and a multiplying/dividing means for the mantissas are disposed in parallel. Specifically, there has been adopted a structure comprising: the digit-aligning means for aligning digits of the mantissa of the first operand and digits of the mantissa of the second operand; the multiplying/dividing means for calculating, from the mantissa of the third operand and the mantissa of the fourth operand, an intermediate product or an intermediate quotient in the form of two intermediate values; a first selecting means for selecting, in the case of addition/subtraction, either one of the above two mantissas with aligned digits as first data and selecting, in the case of multiplication/division, either one of the above two intermediate values as first data; a second selecting means for selecting, in the case of addition/subtraction, the other of the above two mantissas with aligned digits as second data and selecting, in the case of multiplication/division, the other of the above two intermediate values as second data; and an adding/subtracting means for performing addition/subtraction of the above first data and second data.

The second arithmetic apparatus according to the present invention is provided with a structure wherein an (n+m)-bit product is divided and inputted to an adding/subtracting means by focusing on the fact that the process of obtaining, from an (n+m)-bit produce or quotient, a result rounded to n bits can be implemented by hardware used in addition/subtraction. Specifically, there has been adopted a structure comprising: a multiplying/dividing means for calculating an (n+m)-bit product or quotient from the mantissa of the third operand and the mantissa of the fourth operand; a first selecting means for selecting, in the case of addition/subtraction, the mantissa of the first operand as first data and selecting, in the case of multiplication/division, the higher n bits of the above (n+m)-bit product or quotient as first data; a second selecting means for selecting, in the case of addition/subtraction, the mantissa of the second operand as second data and selecting, in the case of multiplication/division, the lower m bits of the above (n+m)-bit product or quotient as second data; a digit-aligning means for aligning, in the case of addition/subtraction, digits of the above first data and digits of the above second data, while generating first bits for rounding, and outputting, in the case of multiplication/division, the above first data, while generating second bits for rounding from the above second data; and an adding/subtracting means for performing, in the case of addition/subtraction, addition/subtraction of the above first data and second data with aligned digits, while performing rounding using the above first bits for rounding, and performing, in the case of multiplication/division, rounding of the above first data by using the above second bits for rounding.

An exponent arithmetic unit according to the present invention has been obtained by focusing on the fact that all the exponent operations in addition/subtraction and in multiplication/division can be implemented by subtraction and adding some circuitry to a subtracter. Specifically, it is an exponent arithmetic unit for floating-point numbers in which an exponent of an augend operand or of a minuend operand is given as an exponent of a first operand, an exponent of an addend operand or of a subtrahend operand is given as an exponent of a second operand, an exponent of a multiplicand operand or of a dividend operand is given as an exponent of a third operand, and an exponent of a multiplier operand or of a divisor operand is given as an exponent of a fourth operand and which has adopted a structure comprising, if the exponent of the first operand or of the third operand is a first n-bit exponent X, the exponent of the second operand or of the fourth operand is a second n-bit exponent Y, and a bias of an exponent is $B=2^{(n-1)}-1$: n 1-bit inverters; a logic gate; a subtracter; an (n+1)-bit inverter; and an output selector, which have the following respective functions.

That is, the n 1-bit inverters are for providing n-bit intermediate data composed solely of the second exponent Y in the case of addition/subtraction, composed of the most significant bit of the second exponent Y and of the values obtained by inverting the respective lower (n−1) bits of the second exponent Y in the case of multiplication, and composed of the value obtained by inverting the most significant bit of the second exponent Y and of the lower (n−1) bits of the second exponent Y in the case of division. The logic gate is for duplicating, in a position higher than the most significant bit of the n-bit intermediate data obtained by the above n 1-bit inverters, 0 in the case of addition/subtraction and the value of the most significant bit of the n-bit intermediate data in the case of multiplication/division. The subtracter is for calculating, by using the first exponent X as dividend data IA, a first subtraction result P=IA−IB and a second subtraction result Q=IA−(IB+1). The (n+1)-bit inverter is for providing the values obtained by inverting respective (n+1) bits composing the above second subtraction result Q. The output selector is for selecting, if X≧Y and in the case of addition/subtraction, the above first subtraction result P so that a signal indicating that the exponent of the first operand is not smaller than the exponent of the second operand and the absolute value X−Y of the difference between the exponent of the first operand and the exponent of the second operand are outputted, selecting, if X<Y and in the case of addition/subtraction, the result from the above (n+1)-bit inverter so that a signal indicating that the exponent of the first operand is smaller than the exponent of the second operand and the absolute value Y−X of the difference between the exponent of the first operand and the exponent of the second operand are outputted, selecting, in the case of multiplication, the above first subtraction result P so that a product exponent X+Y−B is outputted, and selecting, in the case of division, the above second subtraction result Q so that a quotient exponent X−Y+B is outputted.

BRIEF DESCRIPTION OF THE DRAWINGS

FIGS. 2A and 2B are views for illustrating the operation of an adder/subtracter shown in FIG. 1:

DETAILED DESCRIPTION OF THE INVENTION

Below, the embodiments of the present invention will be described with reference to the drawings.
(First Embodiment)

Figure 1:
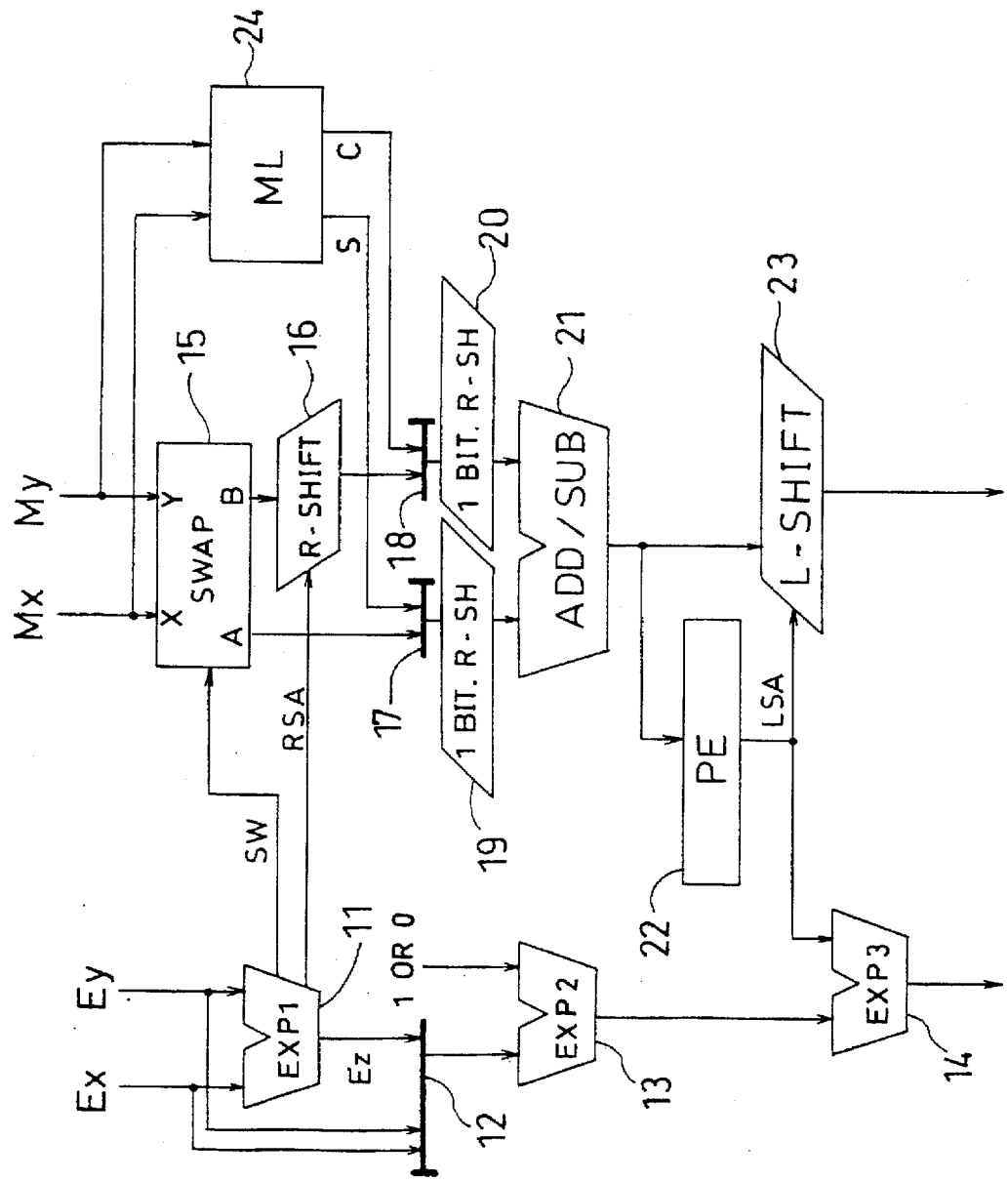
FIG. 1 is a block diagram showing the structure of an arithmetic apparatus for floating-point numbers according to a first embodiment of the present invention.

FIG. 1 is a view showing the structure of an arithmetic apparatus for floating-point numbers according to a first embodiment of the present invention. In the drawing, a reference numeral 11 designates a first exponent arithmetic unit. In addition and subtraction, the first exponent arithmetic unit 11 calculates the absolute value of the exponent difference between two exponent inputs Ex and Ey, generates a swap signal SW for determining, from the calculation result, whether or not the swapping of mantissas should be performed, and outputs the absolute value of the exponent difference as a right-shift amount RSA. In multiplication, the first exponent arithmetic unit 11 calculates a product exponent Ez of Ex and Ey. In division, the first exponent arithmetic unit 11 calculates a quotient exponent Ez of Ex and Ey. A reference numeral 12 designates an exponent selector for selecting one of the calculation result Ez and exponent inputs Ex and Ey in the first exponent arithmetic unit 11. A reference numeral 13 designates a second exponent arithmetic unit for executing the addition/subtraction of an output of the exponent selector 12 and a constant.

A reference numeral 15 designates a swapper for outputting two inputs X and Y so that A=X, B=Y or A=Y, B=X are satisfied in accordance with the swap signal SW generated in the first exponent arithmetic unit 11. A reference numeral 16 designates a right shifter for right shifting, based on the right-shift amount RSA outputted from the first exponent arithmetic unit 11, the output from the B side of the swapper 15 and generating bits for rounding. A reference numeral 24 designates a multiplier for executing the multiplication of two mantissa inputs Mx and My and outputting an intermediate sum S and a carry C. A reference numeral 17 designates a first mantissa selector for selecting either one of the output from the A side of the swapper 15 and the output S from the multiplier 24. A reference numeral 18 designates a second mantissa selector for selecting either one of the output from the right shifter 16 and the output C from the multiplier 24. A reference numeral 19 designates a 1-bit right shifter for outputting, in accordance with the type of operation being executed, the result of having right shifted the output from the first mantissa selector 17 or the output from the first mantissa selector 17 as it is. A reference numeral 20 designates a 1-bit right shifter for similarly outputting the result of having right shifted the output from the second mantissa selector 18 or the output from the second mantissa selector 18 as it is. A reference numeral 21 designates an adder/subtracter for executing addition/subtraction and rounding with respect to outputs of the 1-bit right shifters 19 and 20. A reference numeral 22 designates a priority encoder for detecting the position of the first "1" in an output from the adder/subtracter 21 so as to provide the number of leading "0"s and outputting the number as a left-shift amount LSA. A reference numeral 23 designates a left-shifter for left shifting, based on the left-shift amount LSA, an output of the adder/subtracter 21. A reference numeral 14 designates a third exponent arithmetic unit for subtracting the left-shift amount LSA obtained in the priority encoder 22 from an output of the second exponent arithmetic unit 13.

A description will be given to the operation of the arithmetic apparatus for floating-point numbers thus constituted. In the case of executing the addition of floating-point numbers, it is necessary to initially calculate the exponent difference and right shift the mantissa having the smaller exponent by the exponent difference so as to align the digits of the mantissas.

To accomplish this, the exponent difference (Ex−Ey) is calculated in the first exponent arithmetic unit 11 and the absolute value thereof is calculated as the right-shift amount RSA. On the other hand, it is possible to judge which one of the two exponents Ex and Ey is the larger from the presence or absence of a borrow resulting from the most significant bit in the calculation of Ex−Ey. If there is a borrow, Ex−Ey<0, i.e., Ex<Ey is satisfied, so that the borrow is outputted as the swap signal SW. The exponent selector 12 outputs the larger one of the exponents Ex and Ey to the second exponent arithmetic unit 13 in accordance with the value of the borrow.

Subsequently, the two mantissas Mx and My are inputted to the swapper 15 and, if the swap signal SW satisfies SW=1, i.e., Ex<Ey, they are outputted as A=My, B=Mx. If the swap signal SW satisfies SW=0, i.e., Ex≧Ey, the two mantissas Mx and My are outputted as A=Mx, B=My. Accordingly, the mantissa of the operand having the smaller exponent is always inputted to the right shifter 16. The right shifter 16 right shifts, based on the right-shift amount RSA, the output from the B side of the swapper 15 and outputs it to the second mantissa selector 18, thereby completing the alignment of the digits of the mantissas. To execute the operation of the mantissas thus aligned, the first mantissa selector 17 selects the output from the A side of the swapper 15 and outputs it to the 1-bit right shifter 19, while the second mantissa selector 18 selects the output from the right shifter 16 and outputs it to the 1-bit right shifter 20.

Next, addition/subtraction and rounding will be performed with respect to the aligned mantissas. In order to implement the rounding defined in the IEEE 754 standard, at least two rounding bits are required. Of the two rounding bits, the lower 1 bit is termed a sticky bit which indicates whether or not all the digits positioned lower than the sticky bit are 0s.

If the two rounding bits are represented by r and s in descending order, the following three calculation results prior to rounding are possible. Here, "*" designates "1" or "0."

(a) 1*. *** . . . *rs
(b) 1* . . . rs
(c) 0* . . . *rs

Since the carry resulting from rounding is generated from the position of r to the digits higher than r, three positions of carries should be prepared if no measure is taken. However, if the addition of floating-point numbers of the same sign or the subtraction of floating-point numbers of the different signs is performed in addition/subtraction, the result of the addition or subtraction should be either of the results in the cases of (a) and (b). In the other cases, the result should be either of the results in the cases of (b) and (c). In the present embodiment, if a carry is generated in a mantissa, an input is right shifted by 1 bit in each of the 1-bit right shifters 19 and 20 and then outputted to the adder/subtracter 21. If a carry is not generated in a mantissa in the present embodiment, an input is not shifted in each of the 1-bit right shifters 19 and 20 so that it is outputted as it is to the adder/subtracter 21. Thus, even when there is a carry in a mantissa, inputs can be treated as in the cases (b) and (c), so that the number of positions of carries for rounding can be reduced to two. In the case where shifting is conducted in each of the 1-bit right shifters 19 and 20, it is necessary to correct the exponent, so that the second exponent arithmetic unit 13 outputs the result obtained by adding 1 to its input to the exponent arithmetic unit 14. In the other cases, it is not necessary to correct the exponent, so that the second exponent arithmetic unit 13 outputs its input as it is to the third exponent arithmetic unit 14.

The outputs of the 1-bit right shifters 19 and 20 thus obtained are inputted to the adder/subtracter 21 so that addition/subtraction and rounding are performed. The result of addition/subtraction is outputted to the priority encoder 22 and to the left shifter 23.

Although the sticky bit s for rounding is generated when shifting is conducted in the right shifter 16, the position of s in the case of (b) is shifted to a 1-bit lower position so that s occupies the same position as in the case of (c), thereby reducing the amount of hardware of the right shifter 16. If the rounding bits increased by shifting the position of s are represented by g, combinations of mantissas with which the calculation results prior to rounding become those in the cases of (b) and (c) are shown in FIGS. 2A and 2B, respectively. Here, x or y represents "1" or "0."

In the adder/subtracter 21, addition/subtraction and rounding are implemented as follows. Addition/subtraction is performed with respect to the digits higher than g of FIG. 2A in two inputs, thereby preparing a calculation result Z1 in the case where there is a carry from the least significant digit and a calculation result Z0 in the case where there is no carry. Meanwhile, carries Cgb and Cgc from the digit of g in the both cases of FIGS. 2A and 2B are calculated with respect to the digit of g and the digits lower than g. In the case of FIG. 2A, a carry for rounding by grs becomes Cgb. In the case of FIG. 2B, Cgc is determined by a carry for rounding by rs and the value of the digit g. The output from the adder/subtracter 21 becomes Z1 or Z0 for a digit higher than g, while it becomes the calculation result or 0 for the digit of g, depending on whether addition or subtraction has been performed with respect to the value of the most significant digit in the calculation results Z1 or Z0, to the carries Cgb and Cgc, and to mantissas. In this manner, addition/subtraction and rounding are implemented by means of the single adder/subtracter 21.

The priority encoder 22 detects the position of the first "1" in an input, which implies providing the number of leading "0"s, thereby obtaining the left-shift amount LSA for normalizing the addition/subtraction result from the adder/subtracter 21. In the left shifter 23, the output from the adder/subtracter 21 is left shifted in accordance with the left-shift amount LSA outputted from the priority encoder 22, so that a normalized mantissa is outputted therefrom. The third exponent arithmetic unit 14 corrects an exponent by subtracting the left-shift amount LSA outputted from the priority encoder 22 from the output from the second exponent arithmetic unit 18 and outputs the corrected exponent. The above operation enables the execution of the addition/subtraction of floating-point numbers.

Next, a description will be given to the operation in the case of performing the multiplication of floating-point numbers. In the case of performing the multiplication of floating-point numbers, the product exponent Ez of Ex and Ey is initially calculated in the first exponent arithmetic unit 11. The calculated product exponent Ez is selected by the exponent selector 12 and inputted to the second exponent arithmetic unit 13. The mantissas Mx and My are multiplied in the multiplier 24, so that the multiplication result is outputted in the form of intermediate sum S and carry C. The first mantissa selector 17 selects the intermediate sum S and outputs it to the 1-bit right shifter 19, while the second mantissa selector 18 selects the carry C and outputs it to the 1-bit right shifter 20.

In the multiplication of floating-point numbers, since the addition result prior to rounding always becomes the calculation result in the case of (a) or (b), an input is right shifted by 1 bit in each of the 1-bit right shifters 19 and 20. The outputs of the 1-bit shifters 19 and 20 are added in the adder/subtracter 21 and rounded, thus providing the result of the multiplication of the mantissas. As for the subsequent operation in the priority encoder 22, left shifter 23, and third exponent arithmetic unit 14, it is the same as the operation described above in the case of performing the addition/subtraction of floating-point numbers.

Meanwhile, the first exponent arithmetic unit 11 obtains the product exponent Ez=Ex+Ey−B by using B as a bias of the exponent and outputs it to the exponent selector 12. The exponent selector 12 selects the output from the exponent arithmetic unit 11 and inputs it to the second exponent arithmetic unit 18. Since shifting was conducted in each of the 1-bit right shifters 19 and 20, the second exponent arithmetic unit 18 outputs the result obtained by adding 1 to its input to the exponent arithmetic unit 14. The operation in the third exponent arithmetic unit 14 is the same as the operation described above in the case of performing the addition/subtraction of floating-point numbers. In this manner, the multiplication of floating-point numbers can be executed.

Next, a description will be given to the operation in the case of performing the division of floating-point numbers. The division X/Y is performed using a ROM (Read Only Memory) in which the reciprocal of the mantissa of Y is stored. Here, it is assumed that the exponent and mantissa of X are Xe and Xf, respectively, and that the exponent and mantissa of Y are Ye and Yf, respectively. The reciprocal of the mantissa Yf is read from the ROM (not shown) and inputted as My of FIG. 1 to the multiplier 24. On the other hand, the mantissa Xf is inputted as Mx of FIG. 1 to the multiplier 24, thereby providing a multiplication result Mx·My=Xf/Yf in the form of intermediate sum S and carry C. The first mantissa selector 17 selects the intermediate sum S and outputs it to the 1-bit right shifter 19, while the second mantissa selector 18 selects the carry C and outputs it to the 1-bit right shifter 20.

In the division of floating-point numbers, since the addition result prior to rounding becomes always the calculation result in the case of (b) or (c), each of the 1-bit right shifters 19 and 20 outputs its input as it is to the adder/subtracter 21. The outputs of the 1-bit right shifters 19 and 20 are added by the adder/subtracter 21 and then rounded, thus providing the result of the division of the mantissas. As for the subsequent operation in the priority encoder 22 and left-shifter 23, it is the same as the operation described above in the case of performing the addition/subtraction of floating-point numbers.

On the other hand, the exponents Xe and Ye are inputted as the Ex and Ey of FIG. 1 to the first exponent arithmetic unit 11. The first arithmetic apparatus 11 provides the quotient exponent Ez=Ex−Ey+B by using B as a bias of the exponent and outputs it to the exponent selector 12. The exponent selector 12 selects the output from the exponent arithmetic unit 11 and outputs it to the second exponent arithmetic unit 13. Since shifting is not conducted in either of the 1-bit right shifters 19 and 20, the second exponent arithmetic unit 13 outputs its input as it is to the third exponent arithmetic unit 14. As for the operation in the third exponent arithmetic unit 14, it is the same as the operation described above in the case of performing the addition/subtraction of floating-point numbers. In this manner, the division of floating-point numbers can be executed.

Thus, according to the present embodiment, the adder/subtracter 21 can be used for both addition/subtraction and multiplication/division by selecting between the output from the digit-aligning means consisting of the swapper 15 and right shifter 16 and the output from the multiplier 24 in the first and second mantissa selectors 17 and 18, depending on the type of operation being performed. Moreover, with the provision of the 1-bit right shifters 19 and 20, the correction of an exponent associated with a carry of a mantissa can be performed in parallel with the addition/subtraction of the mantissas, which enables high-speed processing.

Although the intermediate sum S and carry C outputted from the multiplier 21 are added in the adder/subtracter 21, the multiplication result may be provided as the intermediate value between a positive number and a negative number, as outputted from a multiplier using redundant binary numbers, so that the adder/subtracter 21 performs the operation of subtracting the negative number from the positive number.

Alternatively, if exponent registers are interposed between the exponent selector 12 and the second exponent arithmetic unit 13 and between the second exponent arithmetic unit 13 and the third exponent arithmetic unit 14 and if mantissa registers are interposed between the first mantissa selector 17 and the 1-bit right shifter 19, between the second mantissa selector 18 and the 1-bit right shifter 20, and between the adder/subtracter 21 and the priority encoder 22, a pipelined arithmetic apparatus for floating-point numbers can be implemented. In the pipelined arithmetic apparatus, since each circuit block allocated to each pipeline stage is used only once during the execution of one operation instruction, high-speed processing taking full advantage of the pipeline control system can be performed.

(Second Embodiment)

Figure 3:
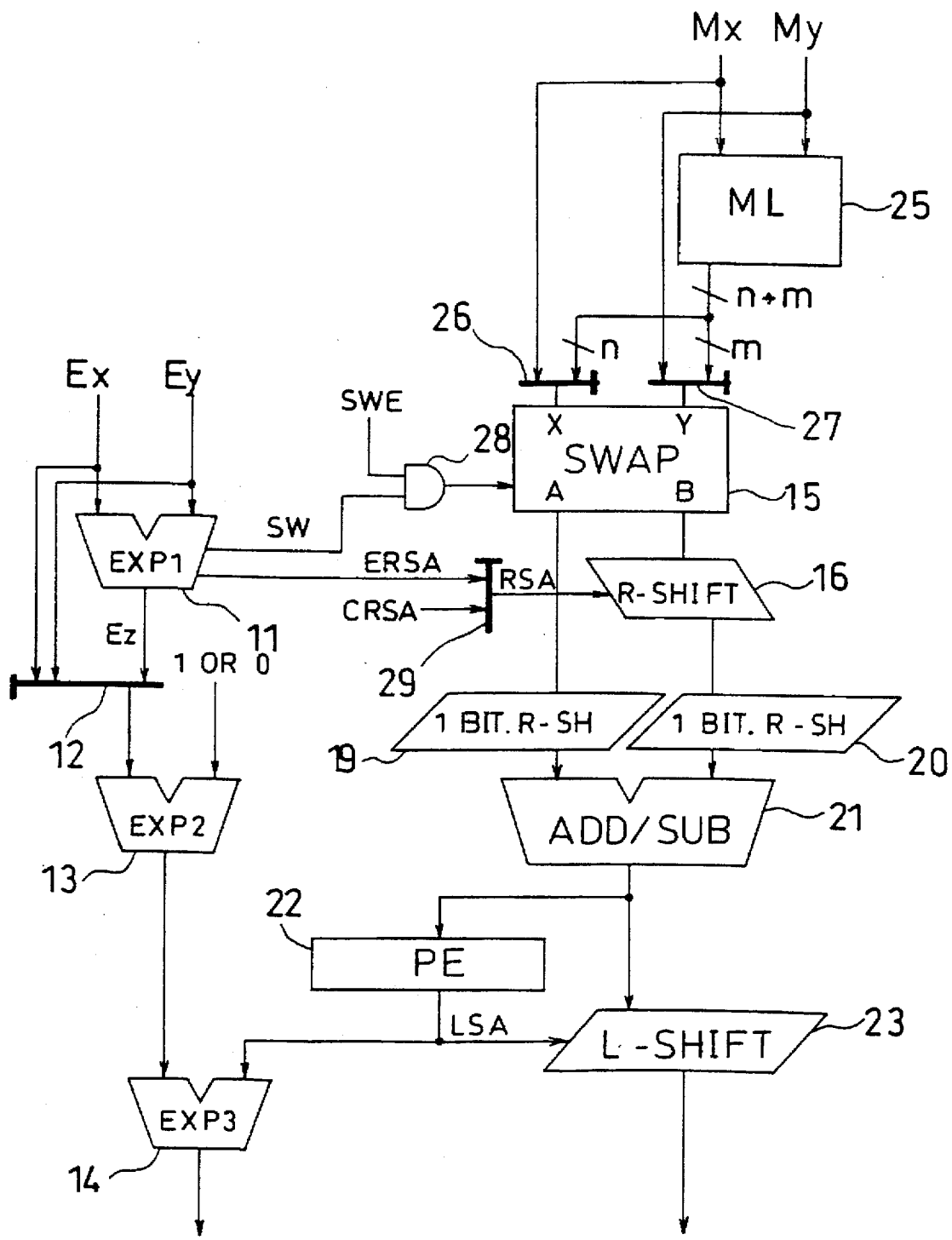
FIG. 3 is a block diagram showing the structure of an arithmetic apparatus for floating-point numbers according to a second embodiment of the present invention.

FIG. 3 is a view showing the structure of an arithmetic apparatus for floating-point numbers according to a second embodiment of the present invention. As for the components of FIG. 3 having like functions as those of the components of FIG. 1, the detailed description thereof will be omitted by providing like reference numerals. A description will be given only to the components having different functions from those of the components of FIG. 1.

In FIG. 3, a reference numeral 25 designates a multiplier for multiplying the mantissas Mx and My and outputting the result in (n+m) bits. A reference numeral 26 designates a first mantissa selector for selecting either one of the mantissa Mx and the higher n bits of the output from the multiplier 25. A reference numeral 27 designates a second mantissa selector for selecting either one of the mantissa My and the lower m bits of the output from the multiplier 25. A reference numeral 28 designates a logic gate for providing, in accordance with the control signal SWE, the swap signal SW outputted from the first exponent arithmetic unit 11 after setting the value thereof to 0 or outputting the swap signal SW as it is. A reference numeral 29 designates a shift-amount selector for selecting, as the right-shift amount RSA, either one of a right-shift amount ERSA outputted from the first exponent arithmetic unit 11 and a right-shift amount CRSA determined by a control unit (not shown).

A description will be given to the operation of the arithmetic apparatus for Floating-point numbers thus constituted. However, since the basic operation thereof is substantially the same as that of the first embodiment, the description will be given only to the portions which are different from the operation of the first embodiment.

In the case of executing the addition/subtraction of floating-point numbers, the first mantissa selector 26 selects the mantissa Mx and outputs it to the input to the X side of the swapper 15, while the second mantissa selector 27 selects the mantissa My and outputs it to the input to the Y side of the swapper 15. To the logic gate 28 is outputted the swap signal SW outputted from the first exponent arithmetic unit 11 as it is. The swapper 15 uses the output from the logic gate 28 as the swap signal and performs the operation described in the first embodiment. The shift-amount selector 29 selects the right-shift amount ERSA outputted from the first exponent arithmetic unit 11, sets it as the right-shift amount RSA, and outputs it to the right shifter 16. The right shifter 16 performs the operation described in the first embodiment. The output from the A side of the swapper 15 is inputted to the 1-bit right shifter 19, while the output from the right shifter 16 is inputted to the 1-bit right shifter 20. The components other than those described above perform the same operations as described in the first embodiment, thereby executing the subtraction of floating-point numbers.

On the other hand, in the case of performing the multiplication of floating-point numbers, the multiplier 25 multiplies the mantissa Mx and My and outputs the result in (n+m) bits. In the multiplication of floating-point numbers in this case, only the higher n bits of the calculation result from the multiplier 25 become significant numbers, while the lower m bits are used for generating rounding bits, so that the first mantissa selector 26 selects the higher n bits of the multiplication result from the multiplier 25 and outputs them to the X side of the swapper 15, while the second mantissa selector 27 selects the lower m bits of the multiplication result from the multiplier 25 and outputs them to the Y side of the swapper 15. The logic gate 28 outputs the swap signal SW after setting the value thereof to 0. The swapper 15 sets the output from the logic gate 28 as the swap signal and performs the operation described in the first embodiment. The shift-amount selector 29 selects the right-shift amount CRSA determined by the control unit (not shown), sets it as the right-shift amount RSA, and outputs it to the right shifter 16. The right shifter 16 right shifts the output from the B side of the swapper 15 in accordance with the right-shift amount RSA. At this stage, the right-shift amount CRSA has been set to m so that the rounding bits can be generated simply by right shifting the lower m bits of the multiplication result by m bits. The adder/subtracter 21 adds the outputs of the 1-bit right shifters 19 and 20, thereby adding the rounding bits generated in the right shifter 16 to the higher n bits of the output from the multiplier 25. After that, rounding is conducted so as to provide an n-bit multiplication result. The components other than those described above perform the same operations as described in the first embodiment so as to execute the multiplication of floating-point numbers. The description of the operation in the case of the division of floating-point numbers is omitted here.

Figure 4:
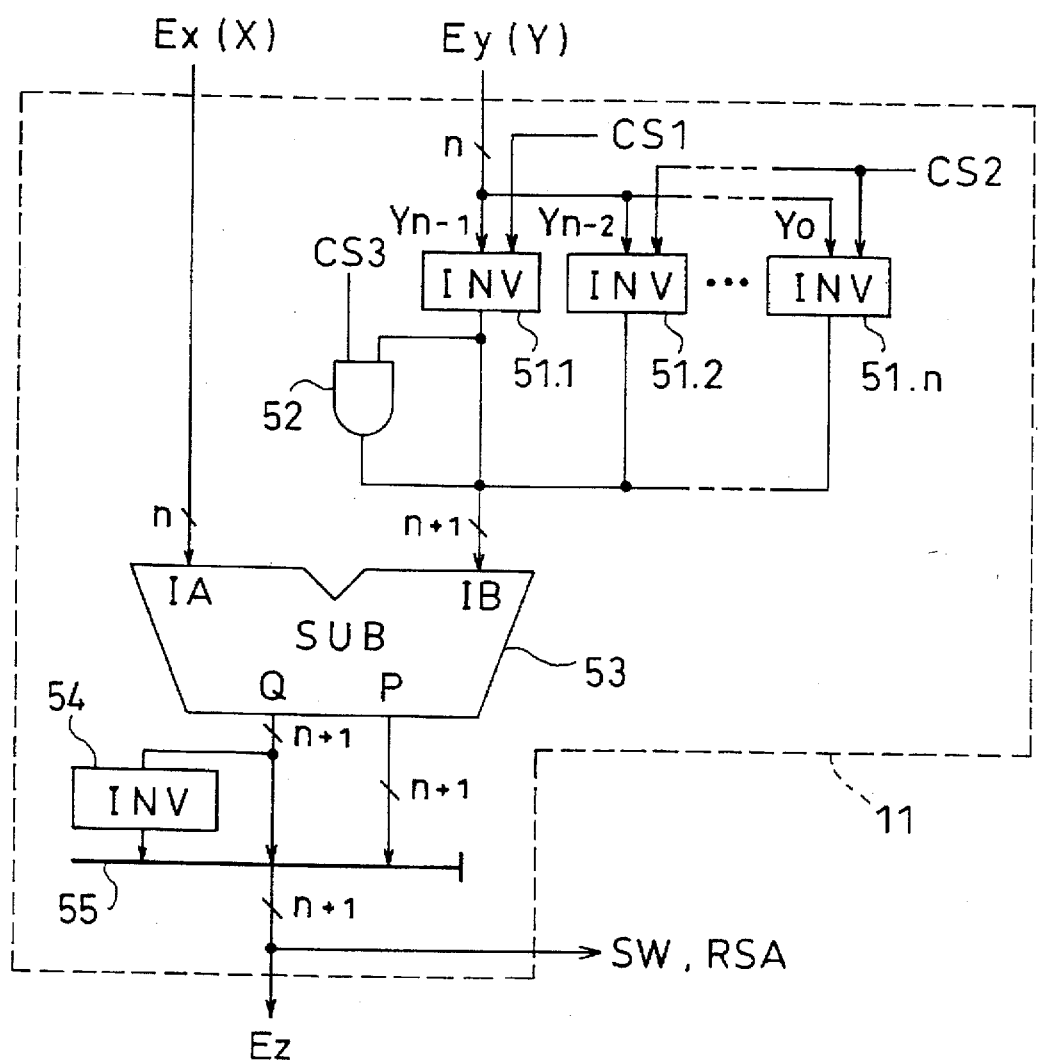
FIG. 4 is a block diagram showing an example of the internal structure of a first exponent arithmetic unit shown in FIGS. 1 and 3.

FIG. 4 shows the internal structure of the first exponent arithmetic unit 11 in FIGS. 1 and 3. In FIG. 4, a reference numeral 53 designates an (n+1)-bit subtracter for executing the subtraction of two inputs IA and IB and outputting subtraction results P=IA−IB and Q=IA−(IB+1). A reference numeral 51.1 designates a 1-bit inverter for inverting an input in accordance with the control signal CS1. A reference numeral 52 designates a logic gate for outputting 0 or the output from the 1-bit inverter 51.1 as it is, depending on the control signal CS3. The output from the logic gate 52 serves as the most significant bit on the subtrahend side IB of the subtracter 53, while the output from the 1-bit inverter 51.1 serves as the second bit from the most significant bit on the subtrahend side IB of the subtracter 53. Reference numerals 51.2 to 51.n designate (n−1) 1-bit inverters, each of which inverts an input in accordance with the control signal CS2. To the lower (n-1) bits on the subtrahend side IB of the subtracter 53 are connected the respective outputs of the 1-bit inverters 51.2 to 51.n. A reference numeral 54 designates an (n+1)-bit inverter for inverting the Q output from the subtracter 53 and outputting the inverted Q output. A reference numeral 55 designates an output selector for selecting among the Q and P outputs from the subtracter 53 and the output from the inverter 54.

The exponent arithmetic unit thus constituted performs the exponent processing in addition, subtraction, multiplication, and division as follows. The minuend IA of the subtracter 53 is a first exponent input X(Ex). An input to each of the n 1-bit inverters 51.1 to 51.n is a second exponent input Y(Ey).

First, using data y obtained by inverting all the bits of the second exponent Y, the product exponent X+Y=B can be represented by the following equation:

$$X + Y - B = X - (B - Y) \qquad (4)$$
$$= X - (B + y + 1).$$

If $$Y = Y_{n-1}2^{(n-1)} + Y_{(n-2)}2^{(n-2)} + \ldots + y_1 2^1 + y_0 \qquad (5),$$

the following equation is satisfied:

$$Y = y_{n-1}2^{(n-1)} + y_{n-2}2^{(n-2)} + \ldots + y_1 2^1 + y_0 2^0 \qquad (6)$$

Hence, the following equation can be derived from the equation (6) and $B = 2^{(n-1)} - 1$:

$$B+y+1 = 2^{(n-1)} - 1 + y + 1 \quad (7)$$
$$= 2^{(n-1)} + y$$
$$= 2^n + (y_{n-1}+1) 2^{(n-1)} +$$
$$y_{n-2} 2^{(n-2)} + \ldots + y_0 2^0.$$

Here, if $Y_{n-1} = 0$ ($\overline{Y}_{n-1}=1$), the following equation can be derived from the equation (7):

$$B+y+1=2^n+2^{(n-1)}+Y_{n-2} 2^{(n-2)}+ \ldots +y_0 2^0 \quad (8).$$

On the other hand, if $y^{n-1}=1$ ($\overline{Y}_{n-1}=0$), the following equation can be derived from the equation (7):

$$B+y+1=2^n+2^n+Y_{n-2} 2^{(n-2)}+ \ldots +Y_0 2^0 \quad (9).$$

Since B−Y>0 is satisfied if $Y_{n-1}=1$, the first and second terms on the right side of the equation (9) can be ignored. Therefore, the following equation can be derived from the equations (8) and (9):

$$B+y+1=Y_{n-1}2^n+\overline{Y}_{n-1}2^{(n-1)}+y_{n-2}2^{(n-2)}+ \ldots +y_0 2^0 \quad (10).$$

On the other hand using data b obtained by inverting all the bits of the bias B, the quotient exponent X−Y+B can be represented by the following equation:

$$X - Y + B = X - (Y - B) \quad (11)$$
$$= X - (Y + b + 1).$$

Since b+1 corresponds to the 2s complement of B, the following equation can be satisfied:

$$b+1=2^n+2^{(n-1)}+1 \quad (12).$$

From the equations (5) and (12), the following equation can be derived:

$$Y+b+1 = Y_{n-1} 2^{(n-1)} + Y_{n-2} 2^{(n-2)} + \ldots + Y_0 2^0 + \quad (13)$$
$$= 2^n + 2^{(n-1)} + 1$$
$$= 2^n + (Y_{n-1}+1) 2^{(n-1)} +$$
$$Y_{n-2} 2^{(n-2)} + \ldots + Y_0 2^0 + 1.$$

Here, if $Y_{n-1}=0$ ($\overline{Y}_{n-1}=1$), the following equation can be derived from the equation (13):

$$Y+b+1=2^n+2^{(n-1)}+Y_{n-2}2^{(n-2)}+ \ldots +Y_0 2^0+1 \quad (14).$$

On the other hand, if $Y_{n-1}=1$ ($\overline{Y}_{n-1}=0$), the following equation can be derived from the equation (13):

$$Y+b+1=2^n+2^n+Y_{n-2}2^{(n-2)}+ \ldots Y_0 2^0+1 \quad (15).$$

Since Y−B>0 is satisfied if $Y_{n-1}=1$, the first and second terms on the right side of the equation (15) can be ignored. Therefore, the following equation can be derived from the equations (14) and (15):

$$Y+b+1=Y_{n-1}2^n+\overline{Y}_{n-1}2^{(n-1)}+Y_{n-2}2^{(n-2)}+ \ldots +Y_0 2^0+1 \quad (16).$$

From the equation (10), it can be appreciated that the subtrahend B+y+1 in the equation (4) is (n+1)-bit data in which each of the higher 2 bits has the same value as that of the most significant bit of the second exponent Y and the lower (n−1) bits have the values obtained by inverting the lower (n−1) bits of the second exponent Y. By subtracting the subtrahend B+y+1 from the first exponent X, the product exponent X+Y−B can be obtained.

From the equation (16), it can be appreciated that the subtrahend Y+b+1 in the equation (11) is data obtained by adding 1 to (n+1)-bit data in which each of the higher two bits has the value obtained by inverting the most significant bit of the second exponent Y and the lower (n−1) bits have the same values as those of the lower (n−1) bits of the second exponent Y. By subtracting the subtrahend Y+b+1 from the first exponent X, the quotient exponent X−Y+B can be obtained.

In multiplication, the 1-bit inverter 51.1 does not perform inverting operation but the (n−1) 1-bit inverters 51.2 to 51.n perform inverting operation, while the control signals CS1, CS2, and CS3 are supplied to the n 1-bit inverters 51.1 to 51.n and to the logic gate 52 so that the logic gate 52 outputs the output from the 1-bit inverter 51.1 as it is. Hence, IA=X, IB=B+y+1 are satisfied. The subtraction result P obtained in this case is:

$$P = IA - IB \quad (17)$$
$$= X - (B + y + 1).$$

From the equation (4), it can be appreciated that the subtraction result P is equal to X+Y−B. The output selector 55 selects the subtraction result P and outputs it as the product exponent Ez.

In division, the 1-bit inverter 51.1 performs inverting operation but (n−1) 1-bit inverters 51.2 to 51.n do not perform inverting operation, while the control signals CS1, CS2, and CS3 are supplied so that the logic gate 52 outputs the output from the 1-bit inverter 51.1 as it is. Hence, IA=X, IB=Y+b are satisfied in the subtracter 53. The subtraction result Q obtained in this case is:

$$Q = IA - (IB + 1) \quad (18)$$
$$= X - (Y + b + 1).$$

From the equation (11), it can be appreciated that the subtraction result Q is equal to X−Y+B. The output selector 55 selects the subtraction result Q and outputs it as the quotient exponent Ez.

In addition/subtraction, none of the n 1-bit inverters 51.1 to 51.n performs inverting operation, while the control signals CS1, CS2, and CS3 are supplied so that the logic gate 52 outputs 0. Hence, IA=X and IB=Y are satisfied in the subtracter 53. The two subtraction results P and Q obtained in this case are:

$$P = IA - IB \quad (19)$$
$$= X - Y$$

$$Q = IA - (IB + 1) \quad (20)$$
$$= X - (Y + 1)$$

As described above, it is necessary to calculate the absolute value of the exponent difference (X−Y) in addition/subtraction. If X−Y≧0, the subtraction P from the subtracter 53 becomes the absolute value to be obtained. However, if X−Y<0, it is necessary to calculate Y−X. Here, whether or not X−Y<0 is satisfied can be judged from the presence or absence of a borrow resulting from the most significant bit in the calculation of X−Y. If there is a borrow, X−Y<0 is satisfied. On the other hand, Y−X can be obtained by inverting all the bits of the subtraction result Q because of the following equation:

$$X - Y = -(Y - X) \quad (21)$$
$$= INV(Y - X) + 1$$

where INV (W) indicates the operation of inverting all the bits of W. From the equation (21), the following equation can be derived:

$$INV(Y-X) = X-Y-1 \quad (22)$$
$$= X-(Y+1).$$

Hence, the Following equation is satisfied:

$$Y-X=INV(X-(Y+1)) \quad (23).$$

In short, Y−X can be obtained by inverting all the bits of the subtraction result Q represented by the equation (20) by means of the (n+1)-bit inverter 54.

In addition/subtraction, the output selector 55 selects the output from the (n+1)-bit inverter 54 if there is a borrow resulting from the most significant bit in the calculation by the subtracter 53, while it selects the subtraction result P from the subtracter 53 if there is no borrow. The most significant bit of the (n+1)-bit output from the output selector 55 is supplied as the swap signal SW to the swapper 15, while the other n bits are supplied as the right-shift amount RSA to the right shifter 16.

If the first exponent arithmetic unit 11 in FIG. 3 adopts the internal structure of FIG. 4, the structures of the first to third exponent arithmetic units 11, 13, and 14 become extremely similar to each other, in which the adders/subtracters are main components. Consequently, the arithmetic apparatus for floating-point numbers of FIGS. 1 to 3 can have a well-balanced pipeline structure. The description of the internal structures of the multipliers 24 and 25 and of the priority encoder 22 will be omitted.

We claim:

1. An arithmetic apparatus for floating-point numbers wherein an exponent and a mantissa of an augend operand or of a minuend operand is given as an exponent and a mantissa of a first operand, an exponent and a mantissa of an addend operand or of a subtrahend operand is given as an exponent and a mantissa of a second operand, an exponent and a mantissa of a multiplicand operand or of a dividend operand is given as an exponent and mantissa of a third operand, and an exponent and a mantissa of a multiplier operand or of a divisor operand is given as an exponent and a mantissa of a fourth operand, said apparatus comprising:

a digit-aligning means for aligning digits of the mantissa of said first operand and digits of the mantissa of said second operand;

a multiplying/dividing means for calculating, from the mantissa of said third operand and the mantissa of said fourth operand, an intermediate product or an intermediate quotient in the form of two intermediate values;

a first selecting means for selecting, in the case of addition/subtraction, either one of said two mantissas with aligned digits as first data and selecting, in the case of multiplication/division, either one of said two intermediate values as first data;

a second selecting means for selecting, in the case of addition/subtraction, the other of said two mantissas with aligned digits as second data and selecting, in the case of multiplication/division, the other of said two intermediate values as second data; and an adding/subtracting means for performing addition/subtraction of said first data and said second data.

2. An arithmetic apparatus according to claim 1, wherein said multiplying/dividing means comprises a multiplier for generating, from the mantissa of said third operand and the mantissa of said fourth operand, an intermediate product in the form of an intermediate sum and a carry.

3. An arithmetic apparatus according to claim 1, wherein said digit-aligning means comprises:

a swapper for outputting, as a first numerical value, the mantissa of that one of said first and second operands having the larger exponent and outputting, as a second numerical value, the mantissa of the other operand; and a right shifter for performing a right-shifting process with respect to said second numerical value.

4. An arithmetic apparatus according to claim 3, further comprising:

a first exponent arithmetic unit for supplying, in the case of addition/subtraction, a signal indicating which one of the exponent of said first operand and the exponent of said second operand is the larger to said swapper, while supplying the absolute value of the difference between the exponent of said first operand and the exponent of said second operand as a shift amount to said right shifter, and calculating, in the case of multiplication/division, a product exponent or a quotient exponent from the exponent of said third operand and the exponent of said fourth operand; and an exponent selector for selecting, in the case of addition/subtraction, the larger one of the exponent of said first operand and the exponent of said second operand and selecting, in the case of multiplication/division, said calculated product exponent or quotient exponent.

5. An arithmetic apparatus according to claim 4, wherein while the exponent of said first operand or of said third operand is a first n-bit exponent X, and the exponent of said second operand or of said fourth operand is a second n-bit exponent Y, said first n-bit exponent X and said second n-bit exponent Y being respectively biased by $2^{(n-1)}-1$, said first exponent arithmetic unit comprises:

n 1-bit inverters for providing n-bit intermediate data composed solely of said second exponent Y in the case of addition/subtraction, composed of the most significant bit of said second exponent Y and of the values obtained by inverting the respective lower (n−1) bits of said second exponent Y in the case of multiplication, and composed of the value obtained by inverting the most significant bit of said second exponent Y and of the lower (n−1) bits of said second exponent Y in the case of division;

a logic gate for duplicating, in a position higher than the most significant bit of the n-bit intermediate data obtained by said n 1-bit inverters, 0 in the case of addition/subtraction and the value of the most significant bit of said n-bit intermediate data in the case of multiplication/division;

a subtracter for calculating, by using said first exponent X as dividend data IA, a first subtraction result P=IA−IB and a second subtraction result Q=1A(1B+1);

a (n+1) bit inverter for providing the values obtained by inverting respective (n+1) bits composing said second subtraction result Q; and an output selector for selecting, if X≧Y and in the case of addition/subtraction, said first subtraction result P so that a signal indicating that the exponent of said first operand is not smaller than the exponent of said second operand and the absolute value X−Y of the difference between the exponent of said first operand and the exponent of said second operand are outputted, selecting, if X<Y and in the case of addition/subtraction, the result from said (n+1)-bit inverter so that a signal indicating that the exponent of said first operand is smaller than the exponent of said second operand and the absolute value Y−X of the difference between the exponent of said first operand and the exponent of said second operand are outputted, selecting, in the case of multiplication, said first subtraction result P so that a product exponent X+Y−B is outputted, and selecting, in the case of division, said second subtraction result Q so that a quotient exponent X−Y+B is outputted.

6. An arithmetic apparatus according to claim 4, wherein said right shifter further comprises the function of generating bits for rounding and said adding/subtracting means comprises an adder/ subtracter for performing addition/subtraction and rounding using said bits for rounding, said arithmetic apparatus further comprising:

two 1-bit right shifters for selectively performing or not performing, in accordance with the type of arithmetic operation being performed, a 1-bit right-shifting process with respect to said first data and to said second data, said two 1-bit right shifters being interposed between said first and second selecting means and said adding/subtracting means; and a second exponent arithmetic unit for correcting, in accordance with said 1-bit right-shifting process, the exponent selected by said exponent selector.

7. An arithmetic apparatus according to claim 6, further comprising:

a priority encoder for detecting the position of a first non-zero bit in the result from said adding/subtracting means and thereby providing the number of leading zero bits;

a left shifter for performing a left-shifting process for designating, as the shift amount, said number of zero bits obtained from the result of said adding/subtracting means; and a third exponent arithmetic unit for further correcting, in accordance with said left-shifting process, the exponent corrected by said second exponent arithmetic unit.

8. An arithmetic apparatus for floating-point numbers wherein an exponent and a mantissa of an augend operand or of a minuend operand is given as an exponent and a mantissa of a first operand, an exponent and a mantissa of an addend operand or of a subtrahend operand is given as an exponent and a mantissa of a second operand, an exponent and a mantissa of a multiplicand operand or of a dividend operand is given as an exponent and a mantissa of a third operand, and an exponent and a mantissa of a multiplier operand or of a divisor operand is given as an exponent and a mantissa of a fourth operand, said apparatus comprising:

a multiplying/dividing means for calculating an (n+m)-bit product or quotient from the mantissa of said third operand and the mantissa of said fourth operand;

a first selecting means for selecting, in the case of addition/subtraction, the mantissa of said first operand as first data and selecting, in the case of multiplication/ division, the higher n bits of said (n+m)-bit product or quotient as first data;

a second selecting means for selecting, in the case of addition/subtraction, the mantissa of said second operand as second data and selecting, in the case of multiplication/division, the lower m bits of said (n+m) -bit product or quotient as second data;

a digit-aligning means for aligning, in the case of addition/subtraction, digits of said first data and digits of said second data, while generating first bits for rounding, and outputting, in the case of multiplication/ division, said first data, while generating second bits for rounding from said second data; and an adding/subtracting means for performing, in the case of addition/subtraction, addition/subtraction of said first data and said second data with aligned digits, while performing rounding using said first bits for rounding, and performing, in the case of multiplication/division, rounding of said first data by using said second bits for rounding.

9. An arithmetic apparatus according to claim 8, wherein said digit-aligning means comprises:

a swapper for setting, in the case of addition/subtraction, the mantissa of that one of said first and second operands in relation to said first and second data having the larger exponent as a first numerical value, while outputting the mantissa of the other operand as a second numerical value, and outputting, in the case of multiplication/division, said first data as a first numerical value, while outputting said second data as a second numerical value; and a right shifter for performing a right-shifting process with respect to said second numerical value so that, in the case of addition/subtraction, digits of said first numerical value and digits of said second numerical value are aligned, while said first bits for rounding are generated, and that, in the case of multiplication/division, said second bits for rounding are generated.

10. An arithmetic apparatus according to claim 9, further comprising:

a first exponent arithmetic unit for supplying, in the case of addition/subtraction, a signal indicating which one of the exponent of said first operand and the exponent of said second operand is the larger to said swapper, while supplying the absolute value of the difference between the exponent of said first operand and the exponent of said second operand as a shift amount to said right shifter, and calculating, in the case of multiplication/division, a product exponent or a quotient exponent from the exponent of said third operand and the exponent of said fourth exponent; and an exponent selector for selecting, in the case of addition/ subtraction, the larger one of the exponent of said first operand and the exponent of said second operand and selecting, in the case of multiplication/division, said calculated product exponent or quotient exponent.

11. An arithmetic apparatus according to claim 10, wherein while the exponent of said first operand or of said third operand is a first n-bit exponent X, and the exponent of said second operand or of said fourth operand is a second n-bit exponent Y, said first n-bit exponent X and said second n-bit exponent Y being respectively biased by $2^{(n-1)}-1$, said first exponent arithmetic unit comprises:

n 1-bit inverters for providing n-bit intermediate data composed solely of said second exponent Y in the case of addition/subtraction, composed of the most significant bit of said second exponent Y and of the values obtained by inverting the respective lower (n−1) bits of said second exponent Y in the case of multiplication, and composed of the value obtained by inverting the most significant bit of said second exponent Y and of the lower (n−1) bits of said second exponent Y in the case of division;

a logic gate for duplicating, in a position higher than the most significant bit of the n-bit intermediate data obtained by said n 1-bit inverters, 0 in the case of addition/subtraction and the value of the most significant bit of said n-bit intermediate data in the case of multiplication/division;

a subtracter for calculating, by using said first exponent X as dividend data IA, a first subtraction result P=IA−IB and a second subtraction result Q=IA−(IB+1);

a (n+1)-bit inverter for providing the values obtained by inverting respective (n+1) bits composing said second subtraction result Q; and an output selector for selecting, if X≧Y and in the case of addition/subtraction, said first subtraction result P so that a signal indicating that the exponent of said first operand is not smaller than the exponent of said second operand and the absolute value X−Y of the difference between the exponent of said first operand and the exponent of said second operand are outputted, selecting, if X<Y and in the case of addition/subtraction, the result from said (n+1)-bit inverter so that a signal indicating that the exponent of said first operand is smaller than the exponent of said second operand and the absolute value Y−X of the difference between the exponent of said first operand and the exponent of said second operand are outputted, selecting, in the case of multiplication, said first subtraction result P so that a product exponent X+Y−B is outputted, and selecting, in the case of division, said second subtraction result Q so that a quotient exponent X−Y+B is outputted.

12. An arithmetic apparatus according to claim 10, further comprising:

two 1-bit right shifters for selectively performing or not performing, in accordance with the type of arithmetic operation being performed, a 1-bit right-shifting process with respect to two outputs of said digit-aligning means; and a second exponent arithmetic unit for correcting, in accordance with said 1-bit right-shifting process, the exponent selected by said exponent selector.

13. An arithmetic apparatus according to claim 12, further comprising:

a priority encoder for detecting the position of a first non-zero bit in the result from said adding/subtracting means and thereby providing the number of leading zero bits;

a left shifter for performing a left-shifting process for designating, as the shift amount, said number of zero bits obtained from the result of said adding/subtracting means; and a third exponent arithmetic unit for further correcting, in accordance with said left-shifting process, the exponent corrected by said second exponent arithmetic unit.

14. An exponent arithmetic unit for floating-point numbers wherein an exponent of an augend operand or of a minuend operand is given as an exponent of a first operand, an exponent of an addend operand or of a subtrahend operand is given as an exponent of a second operand, an exponent of a multiplicand operand or of a dividend operand is given as an exponent of a third operand, and an exponent of a multiplier operand or of a divisor operand is given as an exponent of a fourth operand, said unit comprising, while the exponent of said first operand or of said third operand is a first n-bit exponent X, and the exponent of said second operand or of said fourth operand is a second n-bit exponent Y, said first n-bit exponent X and said second n-bit exponent Y being respectively biased by $2^{(n-1)}-1$:

n 1-bit inverters for providing n-bit intermediate data composed solely of said second exponent Y in the case of addition/subtraction, composed of the most significant bit of said second exponent Y and of the values obtained by inverting the respective lower (n−1) bits of said second exponent Y in the case of multiplication, and composed of the value obtained by inverting the most significant bit of said second exponent Y and of the lower (n−1) bits of said second exponent Y in the case of division;

a logic gate for duplicating, in a position higher than the most significant bit of the n-bit intermediate data obtained by said n 1-bit inverters, 0 in the case of addition/subtraction and the value of the most significant bit of said n-bit intermediate data in the case of multiplication/division;

a subtracter for calculating, by using said first exponent X as dividend data IA, a first subtraction result P=IA−IB and a second subtraction result Q=IA−(IB+1);

a (n+1) bit inverter for providing the values obtained by inverting respective (n+1) bits composing said second subtraction result Q; and an output selector for selecting, if X≧Y and in the case of addition/subtraction, said first subtraction result P so that a signal indicating that the exponent of said first operand is not smaller than the exponent of said second operand and the absolute value X−Y of the difference between the exponent of said first operand and the exponent of said second operand are outputted, selecting, if X<Y and in the case of addition/subtraction, the result from said (n+1)-bit inverter so that a signal indicating that the exponent of said first operand is smaller than the exponent of said second operand and the absolute value Y−X of the difference between the exponent of said first operand and the exponent of said second operand are outputted, selecting, in the case of multiplication, said first subtraction result P so that a product exponent X+Y−B is outputted, and selecting, in the case of division, said second subtraction result Q so that a quotient exponent X−Y+B is outputted.

* * * * *

UNITED STATES PATENT AND TRADEMARK OFFICE
CERTIFICATE OF CORRECTION

PATENT NO. : 5,677,861
DATED : October 14, 1997
INVENTOR(S) : Genichiro Inoue et al.

It is certified that error appears in the above-indentified patent and that said Letters Patent is hereby corrected as shown below:

<u>Col. 14</u>, line 52, after "1A", but before "(", insert -- - --(dash).

Signed and Sealed this

Fourteenth Day of April, 1998

Attest:

BRUCE LEHMAN

Attesting Officer

Commissioner of Patents and Trademarks